(12) United States Patent
Murdoch et al.

(10) Patent No.: US 11,128,457 B2
(45) Date of Patent: Sep. 21, 2021

(54) CRYPTOGRAPHIC KEY GENERATION USING EXTERNAL ENTROPY GENERATION

(71) Applicant: Microsoft Technology Licensing, LLC, Redmond, WA (US)

(72) Inventors: Brandon Murdoch, Reading (GB); Ankur Patel, Sammamish, WA (US); Daniel James Buchner, Los Gatos, CA (US); Ronald John Kamiel Eurphrasia Bjones, Dilbeek (BE)

(73) Assignee: Microsoft Technology Licensing, LLC, Redmond, WA (US)

(*) Notice: Subject to any disclaimer, the term of this patent is extended or adjusted under 35 U.S.C. 154(b) by 114 days.

(21) Appl. No.: 16/445,095

(22) Filed: Jun. 18, 2019

(65) Prior Publication Data

US 2020/0403789 A1 Dec. 24, 2020

(51) Int. Cl.
*H04L 9/08* (2006.01)
*H04L 9/06* (2006.01)
*H04W 12/041* (2021.01)

(52) U.S. Cl.
CPC .......... *H04L 9/0869* (2013.01); *H04L 9/0662* (2013.01); *H04L 9/0861* (2013.01); *H04W 12/041* (2021.01)

(58) Field of Classification Search
CPC ....... H04L 9/08; H04L 9/0869; H04L 9/0861; H04L 9/0894; H04W 12/04; H04W 12/0401
See application file for complete search history.

(56) References Cited

U.S. PATENT DOCUMENTS

| | | | | |
|---|---|---|---|---|
| 9,548,862 B1* | 1/2017 | Potter | ................... | H04L 9/0869 |
| 9,935,772 B1* | 4/2018 | Madisetti | .............. | H04L 9/0819 |
| 10,116,441 B1 | 10/2018 | Rubin et al. | | |
| 2013/0136255 A1* | 5/2013 | Brown | ................... | H04L 9/001 380/28 |
| 2018/0084032 A1 | 3/2018 | Potlapally et al. | | |
| 2018/0323967 A1* | 11/2018 | Courtney | .............. | H04L 9/0656 |
| 2020/0211099 A1* | 7/2020 | Smith | ................ | G06Q 20/3829 |

OTHER PUBLICATIONS

"International Search Report and Written Opinion Issued in PCT Application No. PCT/US20/031394", dated Jul. 24, 2020, 10 Pages.

* cited by examiner

*Primary Examiner* — Kristine L Kincaid
*Assistant Examiner* — Shaqueal D Wade
(74) *Attorney, Agent, or Firm* — Workman Nydegger

(57) ABSTRACT

Generation of a cryptographic key using one of multiple possible entropy generation components that may provide input entropy. A key generation component provides an interface that exposes one or more characteristics for input entropy to be used to generate a cryptographic key. For applications that are more sensitive to improper key discovery, higher degrees of input entropy may be used to guard against key discovery. During key generation, the key generation component connects with an appropriate entropy generation component via the interface. For instance, the entropy generation component may be selected or adjusted so that it does indeed provide the input entropy meeting the characteristics described by the interface. The key generation component receives the input entropy via the interface, and then uses the input entropy to generate the cryptographic key.

19 Claims, 6 Drawing Sheets

CRYPTOGRAPHIC KEY GENERATION USING EXTERNAL ENTROPY GENERATION

BACKGROUND

An encryption key is a string of bits used by an encryption algorithm in order to transform (i.e., encrypt) plain data into encrypted data (i.e., "cipher data"). A decryption key is a string of bits used by a decryption algorithm in order to transform cipher data into plain data. Here, "cipher data" is data that can only be interpreted after decryption, whereas "plain data" is data that can be interpreted without decryption. Such data may be any structured data, but is often text. In that case, the plain data is often termed "plain text,", and the cipher data is often termed "cipher text." Typically, plain text can be read by a human being to extract meaning, whereas cipher text cannot. Whether the key is used for encryption, decryption, or both, that key is often termed a "cryptographic key". Furthermore, both encryption algorithms and decryption algorithms may be termed a "cryptographic algorithm".

A pseudo-random sequence of bits (often termed "entropy") is often used in order to generate (or even as) a cryptographic key. The use of a pseudo-randomly generated bit sequence as the cryptographic key is advantageous as it makes the cryptographic key difficult to guess. That is important because if the cryptographic key is guessed, that cryptographic key may be used to improperly obtain data. Furthermore, if the cryptographic key is used to authenticate (e.g., in a digital signature), the cryptographic key could be used to impersonate another entity, or tamper with a message without detection.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

Embodiments disclosed herein relate to the generation of a cryptographic key using one of multiple possible entropy generation components that may provide input entropy. A key generation component provides an interface that exposes a set of one or more characteristics for input entropy to be used to generate a cryptographic key. For applications that are more sensitive to improper key discovery, higher degrees of input entropy may be used to guard against key discovery. For applications that are less sensitive to key discovery, a relatively lower degree of input entropy may be used so that keys may be conveniently generated without the rigorous processing and/or time used to generate higher degrees of input entropy.

During key generation, the key generation component connects with an appropriate entropy generation component via the interface. For instance, the entropy generation component may be selected or adjusted so that it does indeed provide the input entropy meeting the characteristics described by the interface. The key generation component receives the input entropy via the interface, and then uses the input entropy to generate the cryptographic key.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Embodiments disclosed herein relate to the generation of a cryptographic key using one of multiple possible entropy generation components that may provide input entropy. A key generation component provides an interface that exposes a set of one or more characteristics for input entropy to be used to generate a cryptographic key. For applications that are more sensitive to improper key discovery, higher degrees of input entropy may be used to guard against key discovery. For applications that are less sensitive to key discovery, a relatively lower degree of input entropy may be used so that keys may be conveniently generated without the rigorous processing and/or time used to generate higher degrees of input entropy.

During key generation, the key generation component connects with an appropriate entropy generation component via the interface. For instance, the entropy generation component may be selected or adjusted so that it does indeed provide the input entropy meeting the characteristics described by the interface. The key generation component receives the input entropy via the interface, and then uses the input entropy to generate the cryptographic key.

Figure 1:
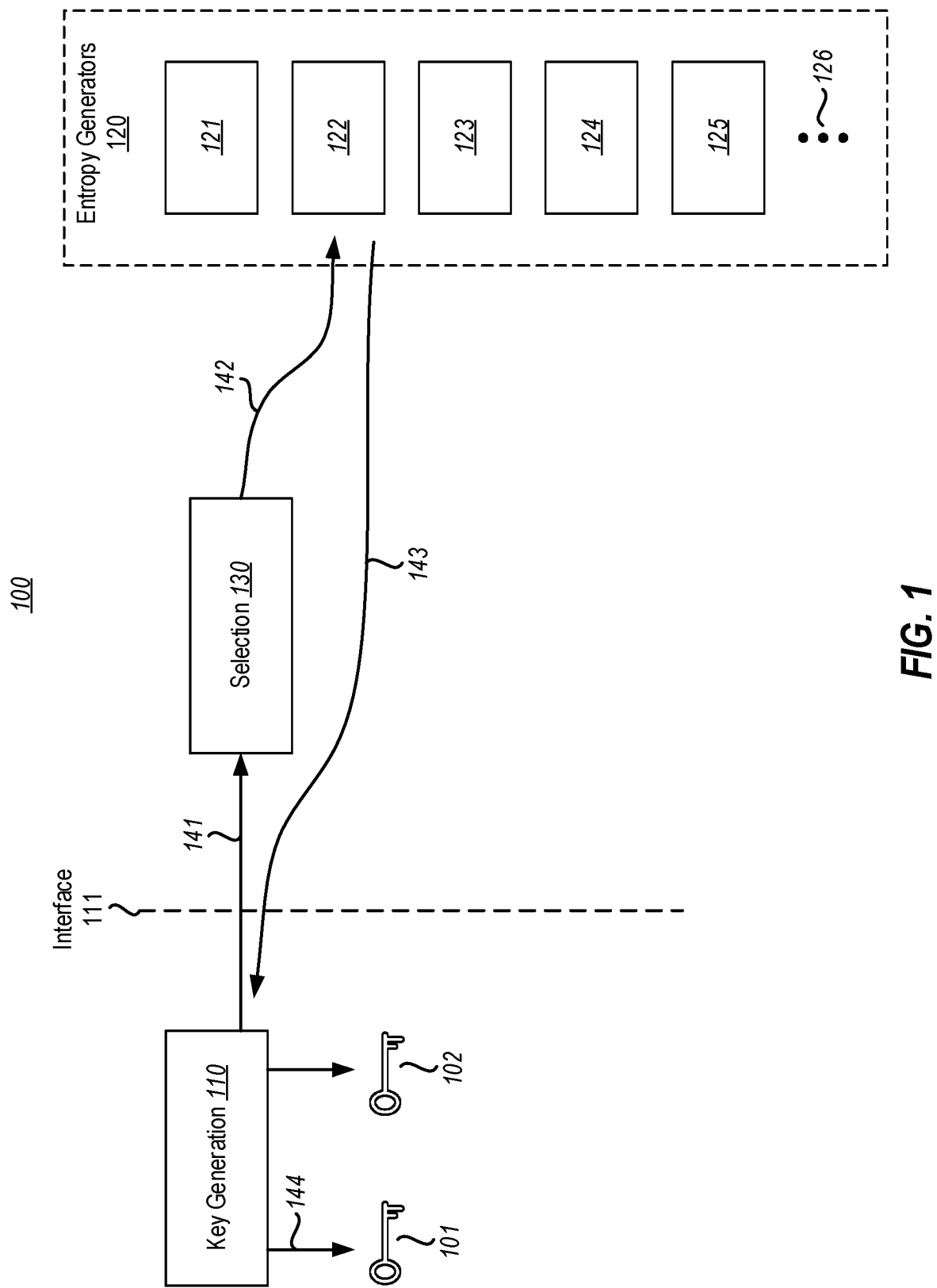
FIG. 1 illustrates a key generation environment in which the principles described herein may be employed, and in which input entropy to cryptographic key generation is performed externally to the key generation itself.

FIG. 1 illustrates an environment 100 in which the principles described herein may be employed. The environment 100 includes a key generation component 110, a library of entropy generation components 120, and an entropy generation component selection component 130.

The key generation component 110 may be operated upon a computing system such as the computing system 300 described below with respect to FIG. 3. In that case, the key generation component 110 may be structured as described for the executable component 306 of FIG. 3. The key generation component 110 generates cryptographic keys (such as cryptographic keys 101 and 102).

Such cryptographic keys may include encryption keys that may be used by an encryption algorithm to transform (i.e., encrypt) plain data into encrypted data (i.e., "cipher data"). Alternatively, or in addition, such cryptographic keys may include decryption keys that may be used by a decryption algorithm to transform (i.e., decrypt) cipher data into plain data. Here, "cipher data" is data that can only be interpreted after decryption, whereas "plain data" is data that can be interpreted without decryption. Such data may be any structured data, but is often text. In that case, the plain data is often termed "plain text,", and the cipher data is often termed "cipher text." Typically, plain text can be read by a human being to extract meaning, whereas cipher text cannot.

The key generation component 110 provides an interface 111 that exposes one or more characteristics (as represented by arrow) 141 of input entropy that is to be used by the key generation component 110 in order to generate a cryptographic key. The input entropy is a pseudo-random sequence of bits. The use of a pseudo-randomly generated bit sequence as the cryptographic key is advantageous as it makes the cryptographic key difficult to guess. That is important because if the cryptographic key is guessed, that cryptographic key may be used to improperly obtain data. The input entropy may even be used as the cryptographic key itself without any further transformation.

The set of one or more cryptographic key input entropy characteristics 141 may be specific to a particular application that will use the cryptographic key, and/or the specific context in which the cryptographic key will be used. For instance, if there is one application (a "first" application) that will use the cryptographic key, there may be one set of input entropy characteristics 141 that are exposed by the interface 111. If there is another application (a "second" application) that will use the cryptographic key, there may be another set of input entropy characteristics 141 that are exposed by the interface 111.

In a specific example of this, if the application is a wallet that holds and encrypts claims issued to a decentralized identifier by a national security agency indicating a level of national security clearance issued for the user associated with the decentralized identifier, the level of input entropy would be high to prevent someone from changing that critical claim. On the other hand, if the wallet holds a claim regarding membership in a hobby club, or whether library dues have been paid, then the input entropy might be much lower.

As another example in which the context in which the cryptographic key will be used is factored into the level of input entropy, there is the consideration of whether the cryptographic key is a master cryptographic key or a derived cryptographic key. If a master cryptographic key is being generated, more rigorous input entropy may be generated, since correctly guessing the master cryptographic key may lead not only to discovery of that master cryptographic key, but also potentially the discovery of derived cryptographic keys that have been derived from that master cryptographic key. On the other hand, if a derived cryptographic key is being generated, then the input entropy level may be reduced since guessing that derived cryptographic key would result in more contained harm. More generally speaking, the input entropy used to generate one cryptographic key (a "parent" cryptographic key) may be at a higher level than the entropy used to generate another cryptographic key (a "child" cryptographic key) that was derived from that parent cryptographic key.

Thus, the set of input entropy characteristics 141 may depend on the application that will use the cryptographic key and/or the context in which the cryptographic key will be used. Furthermore, if the key generation component 110 generates cryptographic keys for different applications and/or contexts, the exposed input entropy characteristics 141 may change depending on which application and/or context for which the current cryptographic key is being generated.

The set of one of more cryptographic key input entropy characteristics exposed by the interface may be any characteristic of the input entropy. As an example, the characteristic could be a size of the input entropy. For instance, the size of the input entropy could be 64 bits, 128 bits, 256 bits, 512 bits, and so on. Generally, the larger the input entropy, the harder it is to guess the corresponding cryptographic key. As another characteristic, there might be the type of input entropy or, in other words, an identification of an algorithm for generating the entropy. There may also be a specified minimum or maximum time for generating the entropy. There may also be a specified level of entropy (e.g., a number of iterations to be used to generate the entropy, and a level of randomness). There may also be a seed to be used to generate the entropy. For instance, background radiation from the birth of the universe is a very random seed to use in generating input entropy, which is even more random than rolling dice.

The environment 100 includes a library 120 of entropy generation components. For instance, the library 120 is illustrated as including five entropy generation components 121 to 125, though the ellipsis 126 represents that the library 120 may include any number of entropy generation components. Each of the entropy generation components 120 is capable of generating input entropy for use in generating a cryptographic key. The library 120 may be operated upon a computing system, such as the computing system 300 described below with respect to FIG. 3. In that case, each of the components 120 may be structured as described below with respect to the executable component 306 of FIG. 3.

The entropy generation components 121 through 125 may be provided separate from the application that runs the key generation component 110. For instance, one or more of the entropy generation components 121 through 125 may be provided by a user or third-party source. Alternatively, or in addition, one or more of the entropy generation components may be provided by an application that will use the cryptographic key being generated (e.g., a wallet of a decentralized identifier).

The entropy generation component selection component 130 is capable of interpreting the one or more characteristics 141 of input entropy that is to be used by the key generation component 110, and selects an appropriate one of the entropy generation components 120 that is capable of providing input entropy having those characteristic(s) 141. The entropy generation component selection component 130 may be operated upon a computing system, such as the computing system 300 described below with respect to FIG. 3. In that case, the entropy generation component selection component 130 may be structured as described below with respect to the executable component 306 of FIG. 3.

The entropy generation component selection component 130 connects the selected entropy generation component to the interface 111, where the selected entropy generation component may then provide the input entropy via the interface 111 to the key generation component 110. For instance, the entropy generation component selection component 130 may establish a direct connection (via the interface 111) between the key generation component and the selected entropy generation component. As another example of a connection, the entropy generation component selection component 130 may cause the selected entropy generation component to run, and then pass the resulting input entropy to the key generation component 110 via the interface 111.

The key generation component 110, each of the entropy generation components 120, and the entropy generation component selection component 130 and may be operated upon the same computing system. At the other extreme, each of the key generation component 110, the entropy generation components 120, and the entropy generation component selection component 130 may be operated by different computing systems. However, the principles described herein are not restricted to whether the environment 100 is provided by a single computing system, or distributed across multiple computing systems. Furthermore, the principles described herein are not limited to the number of the illustrated components that are executed by any given computing system. Nevertheless, the interface 111 permits the input entropy to be separately generated and then provided through the interface for use in cryptographic key generation.

Figure 2:
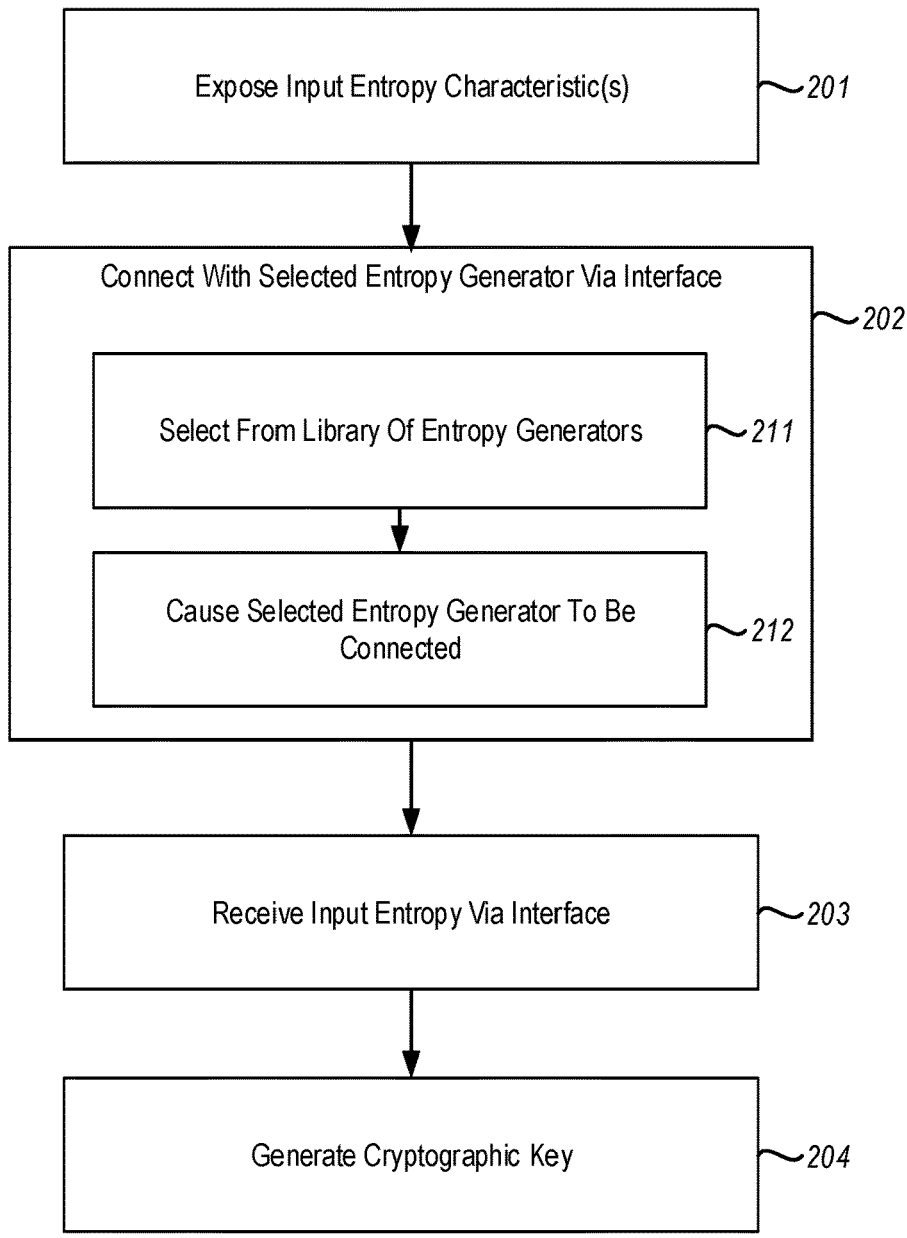
FIG. 2 illustrates a flowchart of a method for generating a cryptographic key, in accordance with the principles described herein.

FIG. 2 illustrates a flowchart of a method 200 for generating a cryptographic key, in accordance with the principles described herein. This is done by connecting with one of multiple possible entropy generation components that may provide input entropy to be used for generating the cryptographic key. The method 200 may be operated within the environment 100 of FIG. 1. For instance, the entropy generation component selection component 130 may connect the appropriate selected entropy generation component 120 (e.g., entropy generation component 122) so that the selected entropy generation component may provide input entropy through the interface 111 to the key generation component 110, whereby the key generation component 110 may generate the key 101 using that input entropy. Accordingly, the method 200 of FIG. 2 will now be described with frequent reference to the environment 100 of FIG. 1.

The method 200 includes providing an interface that exposes a set of one or more cryptographic key input entropy characteristics for input entropy to be used to generate a cryptographic key (act 201). For instance, with reference to FIG. 1, the key generation component 110 offers the interface 111 that exposes the one of more cryptographic key input entropy characteristics 141 for input entropy to be used in generating the cryptographic key 101.

The method 200 then includes connecting with a selected entropy component via the interface (act 202). In one embodiment, this may be performed by selecting the entropy generation component from the library of entropy generation components (act 211), and then causing the selected entropy generation component to be connected via the interface to a key generation component (act 212). For instance, in FIG. 1, the input entropy generation component selection component 130 might select the input entropy generation component 122, and then cause that selected input entropy generation component 122 to be connected to the interface 111. This selection is represented by arrow 142 in FIG. 1.

The method 200 then includes the key generation component receives, via the interface, input entropy from the selected entropy generation component (act 203). For instance, in FIG. 1, as a result of being selected, the selected entropy generation component 122 provides (as represented by arrow 143) the entropy through the interface 111 to the key generation component 110.

The key generation component then generates the cryptographic key using the received input entropy (act 204). For instance, the key generation component 110 may generate (as represented by arrow 144) the cryptographic key 101 using the input entropy provided (as represented by the arrow 143).

Accordingly, the principles provide a level of distributed control in generating cryptographic keys. The cryptographic key generator still is able to control a minimum standard for generating input entropy, without having to generating the input entropy itself. Instead, the key generation component may use a wide variety of input entropy generators as the circumstances warrant.

Because the principles described herein may be performed in the context of a computing system, some introductory discussion of a computing system will be described with respect to FIG. 3. Then, because the key generation may be performed in the context of a decentralized identifier wallet (or management module) that is used to encrypt claims having the decentralized identifier as a subject, a decentralized identity framework environment will thereafter be described with respect to FIGS. 4 to 6.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 3:
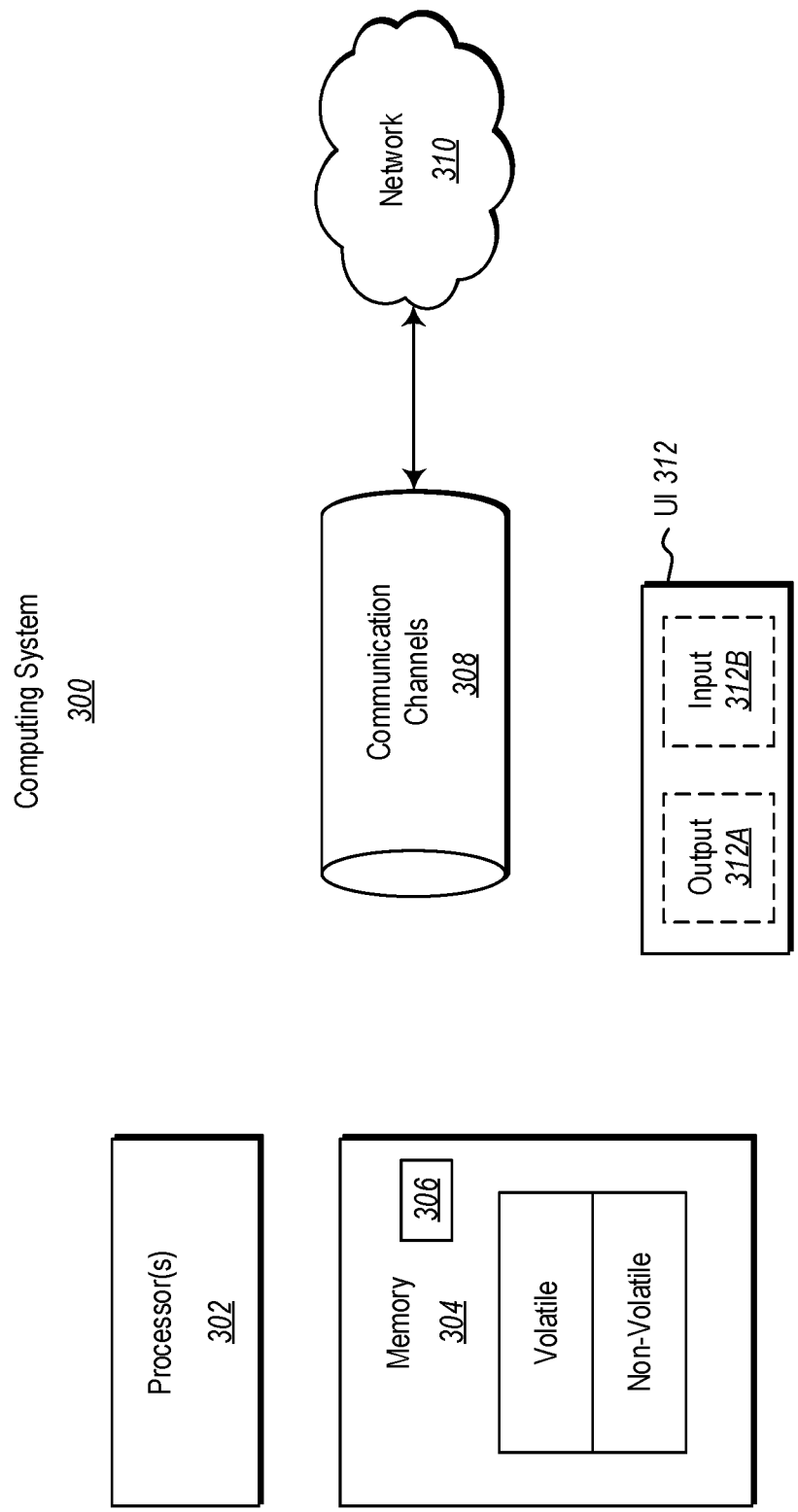
FIG. 3 illustrates an example computing system in which the principles described herein may be employed.

As illustrated in FIG. 3, in its most basic configuration, a computing system 300 typically includes at least one hardware processing unit 302 and memory 304. The processing unit 302 may include a general-purpose processor and may also include a field programmable gate array (FPGA), an application specific integrated circuit (ASIC), or any other specialized circuit. The memory 304 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 300 also has thereon multiple structures often referred to as an "executable component". For instance, the memory 304 of the computing system 300 is illustrated as including executable component 306. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 304 of the computing system 300. Computing system 300 may also contain communication channels 308 that allow the computing system 300 to communicate with other computing systems over, for example, network 310.

While not all computing systems require a user interface, in some embodiments, the computing system 300 includes a user interface system 312 for use in interfacing with a user. The user interface system 312 may include output mechanisms 312A as well as input mechanisms 312B. The principles described herein are not limited to the precise output mechanisms 312A or input mechanisms 312B as such will depend on the nature of the device. However, output mechanisms 312A might include, for instance, speakers, displays, tactile output, virtual or augmented reality, holograms and so forth. Examples of input mechanisms 312B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 300 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant.

Figure 4:
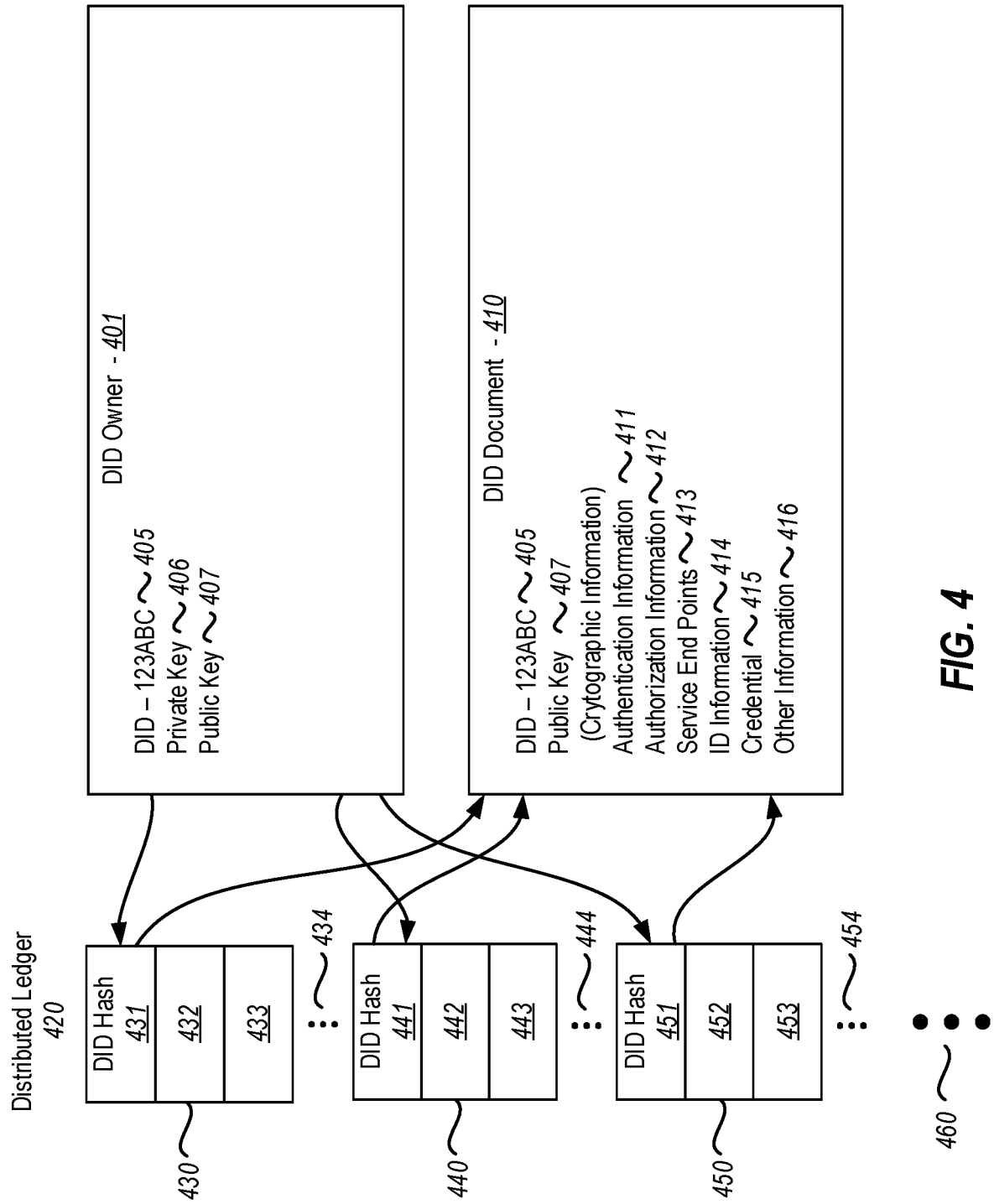
FIG. 4 illustrates an example environment for creating a decentralized identification (DID)

Some introductory discussion of a decentralized identifier (DID) and the environment in which they are created and reside will now be given with respect to FIG. 4. As illustrated in FIG. 4, a DID owner 401 may own or control a DID 405 that represents an identity of the DID owner 401. The DID owner 401 may register a DID using a creation and registration service, which will be explained in more detail below.

The DID owner 401 may be any entity that could benefit from a DID. For example, the DID owner 401 may be a human being or an organization of human beings. Such organizations might include a company, department, government, agency, or any other organization or group of organizations. Each individual human being might have a DID while the organization(s) to which each belongs might likewise have a DID.

The DID owner 401 may alternatively be a machine, system, or device, or a collection of machine(s), device(s) and/or system(s). In still other embodiments, the DID owner 401 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 306 described above with respect to FIG. 3. An example of a complex executable component 306 might be an artificial intelligence. Accordingly, an artificial intelligence may also own a DID.

Thus, the DID owner 401 may be any entity, human or non-human, that is capable of creating the DID 405 or at least having the DID 405 created for and/or associated with them. Although the DID owner 401 is shown as having a single DID 405, this need not be the case as there may be any number of DIDs associated with the DID owner 401 as circumstances warrant.

As mentioned, the DID owner 401 may create and register the DID 405. The DID 405 may be any identifier that may be associated with the DID owner 401. Preferably, that identifier is unique to that DID owner 401, at least within a scope in which the DID is anticipated to be in use. As an example, the identifier may be a locally unique identifier, and perhaps more desirably a globally unique identifier for identity systems anticipated to operate globally. In some embodiments, the DID 405 may be a Uniform Resource identifier (URI) (such as a Uniform Resource Locator (URL)) or other pointer that relates the DID owner 401 to mechanisms to engage in trustable interactions with the DID owner 401.

The DID 405 is "decentralized" because it does not require a centralized, third party management system for generation, management, or use. Accordingly, the DID 405 remains under the control of the DID owner 401. This is different from conventional centralized IDs which base trust on centralized authorities and that remain under control of corporate directory services, certificate authorities, domain name registries, or other centralized authority (referred to collectively as "centralized authorities" herein). Accordingly, the DID 405 may be any identifier that is under the control of the DID owner 401 and that is independent of any centralized authority.

In some embodiments, the structure of the DID 405 may be as simple as a user name or some other human-understandable term. However, in other embodiments, for increased security, the DID 405 may preferably be a random string of numbers and letters. In one embodiment, the DID 405 may be a string of 128 numbers and letters. Accordingly, the embodiments disclosed herein are not dependent on any specific implementation of the DID 405. In a very simple example, the DID 405 is shown within the figures as "123ABC".

As also shown in FIG. 4, the DID owner 401 has control of a private key 406 and public key 407 pair that is associated with the DID 405. Because the DID 405 is independent of any centralized authority, the private key 406 should at all times be fully in control of the DID owner 401. That is, the private and public keys should be generated in a decentralized manner that ensures that they remain under the control of the DID owner 401.

As will be described in more detail to follow, the private key 406 and public key 407 pair may be generated on a device controlled by the DID owner 401. The private key 406 and public key 407 pair should not be generated on a server controlled by any centralized authority as this may cause the private key 406 and public key 407 pair to not be fully under the control of the DID owner 401 at all times. Although FIG. 4 and this description have described a private and public key pair, it will also be noted that other types of reasonable cryptographic information and/or mechanisms may also be used as circumstances warrant.

FIG. 4 also illustrates a DID document 410 that is associated with the DID 405. As will be explained in more detail to follow, the DID document 410 may be generated at the time that the DID 405 is created. In its simplest form, the DID document 410 describes how to use the DID 405. Accordingly, the DID document 410 includes a reference to the DID 405, which is the DID that is described by the DID document 410. In some embodiments, the DID document 410 may be implemented according to methods specified by a distributed ledger 420 (such as blockchain) that will be used to store a representation of the DID 405 as will be explained in more detail to follow. Thus, the DID document 410 may have different methods depending on the specific distributed ledger.

The DID document 410 also includes the public key 407 created by the DID owner 401 or some other equivalent cryptographic information. The public key 407 may be used by third party entities that are given permission by the DID owner 401 to access information and data owned by the DID owner 401. The public key 407 may also be used to verify that the DID owner 401 in fact owns or controls the DID 405.

The DID document 410 may also include authentication information 411. The authentication information 411 may specify one or more mechanisms by which the DID owner 401 is able to prove that the DID owner 401 owns the DID 405. In other words, the mechanisms of the authentication information 411 may show proof of a binding between the DID 405 (and thus its DID owner 401) and the DID document 410. In one embodiment, the authentication information 411 may specify that the public key 407 be used in a signature operation to prove the ownership of the DID 405. Alternatively, or in addition, the authentication information 411 may specify that the public key 407 be used in a biometric operation to prove ownership of the DID 405. Accordingly, the authentication information 411 may include any number of mechanisms by which the DID owner 401 is able to prove that the DID owner 401 owns the DID 405.

The DID document 410 may also include authorization information 412. The authorization information 412 may allow the DID owner 401 to authorize third party entities the rights to modify the DID document 410 or some part of the document without giving the third party the right to prove ownership of the DID 405. For example, the authorization information 412 may allow the third party to update any designated set of one or more fields in the DID document 410 using any designated update mechanism. Alternatively, the authorization information may allow the third party to limit the usages of DID 405 by the DID owner 401 for a specified time period. This may be useful when the DID owner 401 is a minor child and the third party is a parent or guardian of the child. The authorization information 412 may allow the parent or guardian to limit use of the DID owner 401 until such time as the child is no longer a minor.

The authorization information 412 may also specify one or more mechanisms that the third party will need to follow to prove they are authorized to modify the DID document 410. In some embodiments, these mechanisms may be similar to those discussed previously with respect to the authentication information 411.

The DID document 410 may also include one or more service endpoints 413. A service endpoint may include a network address at which a service operates on behalf of the DID owner 401. Examples of specific services include discovery services, social networks, file storage services such as identity servers or hubs, and verifiable claim repository services. Accordingly, the service endpoints 413 operate as pointers for the services that operate on behalf of the DID owner 401. These pointers may be used by the DID owner 401 or by third party entities to access the services that operate on behalf of the DID owner 401. Specific examples of service endpoints 413 will be explained in more detail to follow.

The DID document 410 may further include identification information 414. The identification information 414 may include personally identifiable information such as the name, address, occupation, family members, age, hobbies, interests, or the like of DID owner 401. Accordingly, the identification information 414 listed in the DID document 410 may represent a different persona of the DID owner 401 for different purposes.

A persona may be pseudo anonymous. As an example, the DID owner 401 may include a pen name in the DID document when identifying him or her as a writer posting articles on a blog. A persona may be fully anonymous. As an example, the DID owner 401 may only want to disclose his or her job title or other background data (e.g., a school teacher, an FBI agent, an adult older than 21 years old, etc.) but not his or her name in the DID document. As yet another example, a persona may be specific to who the DID owner 401 is as an individual. As an example, the DID owner 401 may include information identifying him or her as a volunteer for a particular charity organization, an employee of a particular corporation, an award winner of a particular award, and so forth.

The DID document 410 may also include credential information 415, which may also be referred to herein as an attestation. The credential information 415 may be any information that is associated with the DID owner 401's background. For instance, the credential information 415 may be (but not limited to) a qualification, an achievement, a government ID, a government right such as a passport or a driver's license, a payment provider or bank account, a university degree or other educational history, employment status and history, or any other information about the DID owner 401's background.

The DID document 410 may also include various other information 416. In some embodiments, the other information 416 may include metadata specifying when the DID document 410 was created and/or when it was last modified. In other embodiments, the other information 416 may include cryptographic proofs of the integrity of the DID document 410. In still further embodiments, the other information 416 may include additional information that is either specified by the specific method implementing the DID document or desired by the DID owner 401.

FIG. 4 also illustrates a distributed ledger 420. The distributed ledger 420 may be any decentralized, distributed network that includes various computing systems that are in communication with each other. For example, the distributed ledger 420 may include a first distributed computing system 430, a second distributed computing system 440, a third distributed computing system 450, and any number of additional distributed computing systems as illustrated by the ellipses 460. The distributed ledger 420 may operate according to any known standards or methods for distributed ledgers. Examples of conventional distributed ledgers that may correspond to the distributed ledger 420 include, but are not limited to, Bitcoin [BTC], Ethereum, and Litecoin.

In the context of DID 405, the distributed ledger or blockchain 420 is used to store a representation of the DID 405 that points to the DID document 410. In some embodiments, the DID document 410 may be stored on the actual distributed ledger. Alternatively, in other embodiments the DID document 410 may be stored in a data storage (not illustrated) that is associated with the distributed ledger 420.

As mentioned, a representation of the DID 405 is stored on each distributed computing system of the distributed ledger 420. For example, in FIG. 4 this is shown as DID hash 431, DID hash 441, and DID hash 451, which are ideally identical hashed copies of the same DID. The DID hash 431, DID hash 441, and DID hash 451 may then point to the location of the DID document 410. The distributed ledger or blockchain 420 may also store numerous other representations of other DIDs as illustrated by references 432, 433, 434, 442, 443, 444, 452, 453, and 454.

In one embodiment, when the DID owner 401 creates the DID 405 and the associated DID document 410, the DID hash 431, DID hash 441, and DID hash 451 are written to the distributed ledger 420. The distributed ledger 420 thus records that the DID 405 now exists. Since the distributed ledger 420 is decentralized, the DID 405 is not under the control of any entity outside of the DID owner 401. DID hash 431, DID hash 441, and DID hash 451 may each include, in addition to the pointer to the DID document 410, a record or time stamp that specifies when the DID 405 was created. At a later date, when modifications are made to the DID document 410, each modification (and potentially also a timestamp of the modification) may also be recorded in DID hash 431, DID hash 441, and DID hash 451. DID hash 431, DID hash 441, and DID hash 451 may further include a copy of the public key 407 so that the DID 405 is cryptographically bound to the DID document 410.

Figure 5:
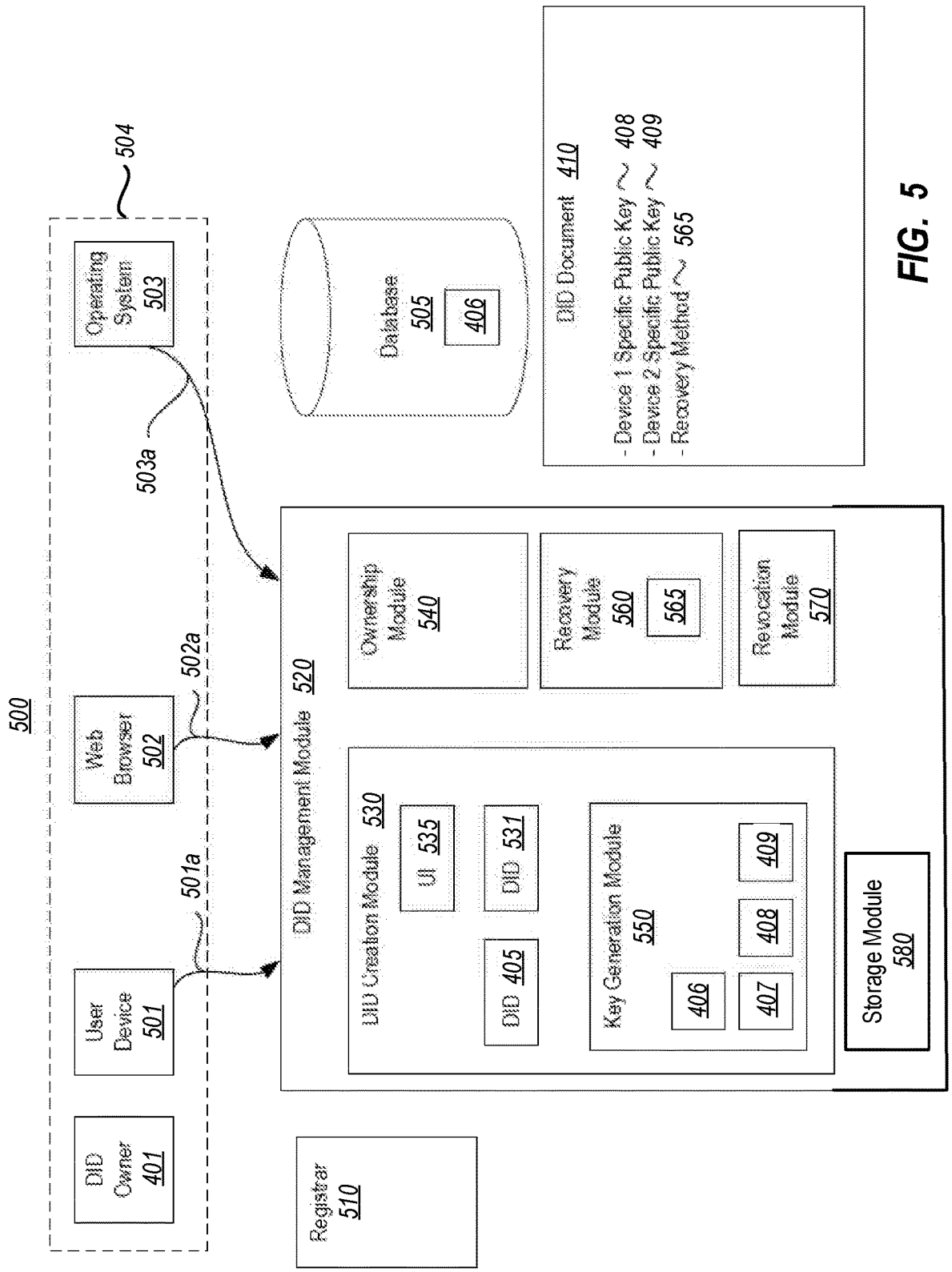
FIG. 5 illustrates an example environment for various DID management operations and services.

Having described DIDs and how they operate generally with reference to FIG. 4, specific embodiments of DID environments will now be explained. Turning to FIG. 5, an environment 500 that may be used to perform various DID management operations and services will now be explained. It will be appreciated that the environment of FIG. 5 may reference elements from FIG. 4 as needed for ease of explanation.

As shown in FIG. 5, the environment 500 may include various devices and computing systems that may be owned or otherwise under the control of the DID owner 401. These may include a user device 501. The user device 501 may be, but is not limited to, a mobile device such as a smart phone, a computing device such as a laptop computer, or any device such as a car or an appliance that includes computing abilities. The device 501 may include a web browser 502 operating on the device and an operating system 503 operating the device. More broadly speaking, the dashed line 504 represents that all of these devices may be owned or otherwise under the control of the DID owner 401.

The environment 500 also includes a DID management module 520. It will be noted that in operation, the DID management module 520 may reside on and be executed by one or more of user device 501, web browser 502, and the operating system 503 as illustrated by respective lines 501a, 502a, and 503a. Accordingly, the DID management module 520 is shown as being separate for ease of explanation. The DID management module 520 may be also described as a "wallet" in that it can hold various claims related to a particular DID. The DID management module 520 may also be described as a "user agent".

As shown in FIG. 5, the DID management module 520 includes a DID creation module 530. The DID creation module 530 may be used by the DID owner 401 to create the DID 405 or any number of additional DIDs, such as DID 531. In one embodiment, the DID creation module may include or otherwise have access to a User Interface (UI) element 535 that may guide the DID owner 401 in creating the DID 405. The DID creation module 530 may have one or more drivers that are configured to work with specific distributed ledgers such as distributed ledger 420 so that the DID 405 complies with the underlying methods of that distributed ledger.

A specific embodiment will now be described. For example, the UI 535 may provide a prompt for the user to enter a user name or some other human recognizable name. This name may be used as a display name for the DID 405 that will be generated. As previously described, the DID 405 may be a long string of random numbers and letters and so having a human-recognizable name for a display name may be advantageous. The DID creation module 530 may then generate the DID 405. In the embodiments having the UI 535, the DID 405 may be shown in a listing of identities and may be associated with the human-recognizable name.

The DID creation module 530 may also include a key generation component 550. The key generation component may generate the private key 406 and public key 407 pair previously described. The DID creation module 530 may then use the DID 405 and the private and public key pair to generate the DID document 410.

In operation, the DID creation module 530 accesses a registrar 510 that is configured to the specific distributed ledger that will be recording the transactions related to the DID 405. The DID creation module 530 uses the registrar 510 to record DID hash 431, DID hash 441, and DID hash 451 in the distributed ledger in the manner previously described, and to store the DID document 410 in the manner previously described. This process may use the public key 407 in the hash generation.

In some embodiments, the DID management module 520 may include an ownership module 540. The ownership module 540 may provide mechanisms that ensure that the DID owner 401 is in sole control of the DID 405. In this way, the provider of the DID management module 520 is able to ensure that the provider does not control the DID 405, but is only providing the management services.

As previously discussed, the key generation component 550 generates the private key 406 and public key 407 pair and the public key 407 is then recorded in the DID document 410. Accordingly, the public key 407 may be used by all devices associated with the DID owner 401 and all third parties that desire to provide services to the DID owner 401. Accordingly, when the DID owner 401 desires to associate a new device with the DID 405, the DID owner 401 may execute the DID creation module 530 on the new device. The DID creation module 530 may then use the registrar 510 to update the DID document 410 to reflect that the new device is now associated with the DID 405, which update would be reflected in a transaction on the distributed ledger 420, as previously described.

In some embodiments, however, it may be advantageous to have a public key per device 501 owned by the DID owner 401 as this may allow the DID owner 401 to sign with the device-specific public key without having to access a general public key. In other words, since the DID owner 401 will use different devices at different times (for example using a mobile phone in one instance and then using a laptop computer in another instance), it is advantageous to have a key associated with each device to provide efficiencies in signing using the keys. Accordingly, in such embodiments the key generation component 550 may generate additional public keys 408 and 409 when the additional devices execute the DID creation module 530. These additional public keys may be associated with the private key 406 or in some instances may be paired with a new private key.

In those embodiments where the additional public keys 408 and 409 are associated with different devices, the additional public keys 408 and 409 may be recorded in the DID document 410 as being associated with those devices. This is shown in FIG. 5. It will be appreciated that the DID document 410 may include the information (information 405, 407 and 411 through 416) previously described in relation to FIG. 4 in addition to the information (information 408, 409 and 565) shown in FIG. 5. If the DID document 410 existed prior to the device-specific public keys being generated, then the DID document 410 would be updated by the creation module 530 via the registrar 510 and this would be reflected in an updated transaction on the distributed ledger 420.

In some embodiments, the DID owner 401 may desire to keep secret the association of a device with a public key or the association of a device with the DID 405. Accordingly, the DID creation module 530 may cause that such data be secretly shown in the DID document 410.

As described thus far, the DID 405 has been associated with all the devices under the control of the DID owner 401, even when the devices have their own public keys. However, in some embodiments it may be useful for each device or some subset of devices under the control of the DID owner 401 to each have their own DID. Thus, in some embodiments the DID creation module 530 may generate an additional DID, for example DID 531, for each device. The DID creation module 530 would then generate private and public key pairs and DID documents for each of the devices and have them recorded on the distributed ledger 420 in the manner previously described. Such embodiments may be advantageous for devices that may change ownership as it may be possible to associate the device-specific DID to the new owner of the device by granting the new owner authorization rights in the DID document and revoking such rights from the old owner.

As mentioned, to ensure that the private key 406 is totally in the control of the DID owner 401, the private key 406 is created on the user device 501, browser 502, or operating system 503 that is owned or controlled by the DID owner 401 that executed the DID management module 520. In this way, there is little chance that a third party (and most consequentially, the provider of the DID management module 520) may gain control of the private key 406.

However, there is a chance that the device storing the private key 406 may be lost by the DID owner 401, which may cause the DID owner 401 to lose access to the DID 405. Accordingly, in some embodiments, the UI 535 may include the option to allow the DID owner 401 to export the private key 406 to an off device secured database 505 that is under the control of the DID owner 401. As an example, the database 505 may be one of the identity hubs 610 described below with respect to FIG. 6. A storage module 580 is configured to store data (such as the private key 406 or attestations made by or about the DID owner 401) off device in the database 505 or identity hubs 610. In some embodiments, the private key 406 may be stored as a QR code that may be scanned by the DID owner 401.

In other embodiments, the DID management module 520 may include a recovery module 560 that may be used to recover a lost private key 406. In operation, the recovery module 560 allows the DID owner 401 to select one or more recovery mechanisms 565 at the time the DID 405 is created that may later be used to recover the lost private key. In those embodiments having the UI 535, the UI 535 may allow the DID owner 401 to provide information that will be used by the one or more recovery mechanisms 565 during recovery. The recovery module 560 may then be run on any device associated with the DID 405.

The DID management module 520 may also include a revocation module 570 that is used to revoke or sever a device from the DID 405. In operation, the revocation module may use the UI element 535, which may allow the DID owner 401 to indicate a desire to remove a device from being associated with the DID 405. In one embodiment, the revocation module 570 may access the DID document 410 and may cause that all references to the device be removed from the DID document 410. Alternatively, the public key for the device may be removed. This change in the DID document 410 may then be reflected as an updated transaction on the distributed ledger 420 as previously described.

Figure 6:
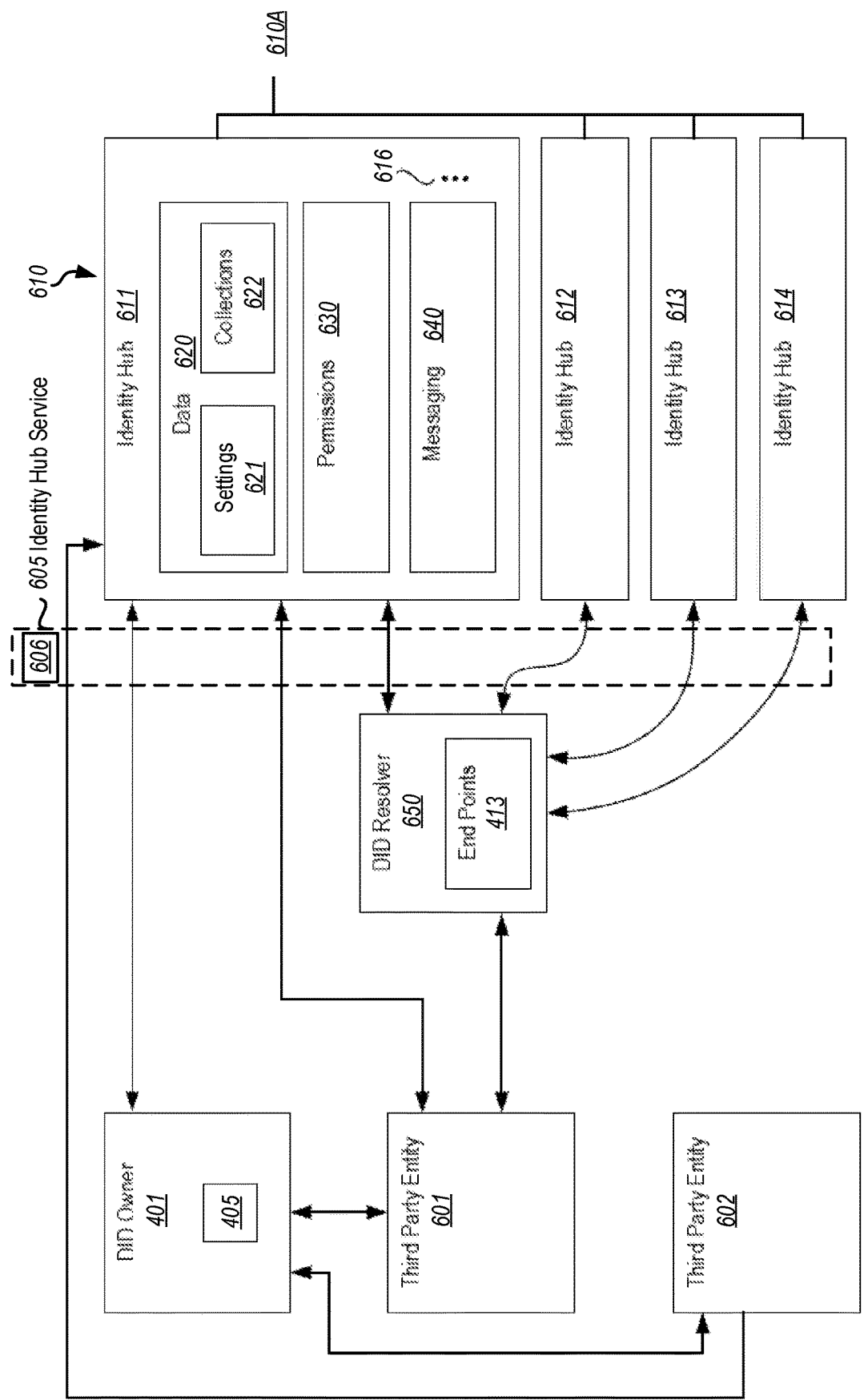
FIG. 6 illustrates an example decentralized storage device or identity hub.

FIG. 6 illustrates an embodiment of an environment 600 in which a DID such as DID 405 may be utilized. Specifically, the environment 600 will be used to describe the use of the DID 405 in relation to one or more decentralized stores or identity hubs 610 that are each under the control of the DID owner 401 to store data belonging to or regarding the DID owner 401. For instance, data may be stored within the identity hubs using the storage module 580 of FIG. 5. It will be noted that FIG. 6 may include references to elements first discussed in relation to FIG. 4 or 5 and thus use the same reference numeral for ease of explanation.

In one embodiment, the identity hubs 610 may be multiple instances of the same identity hub. This is represented by the line 610A. Thus, the various identity hubs 610 may include at least some of the same data and services. Accordingly, if a change is made to part of at least some of the data (and potentially any part of any of the data) in one of the identity hubs 610, the change may be reflected in one or more of (and perhaps all of) the remaining identity hubs.

The identity hubs 610 may be any data store that may be in the exclusive control of the DID owner 401. As an example only, the first identity hub 611 and second identity hub 612 are implemented in cloud storage (perhaps within the same cloud, or even on different clouds managed by different cloud providers) and thus may be able to hold a large amount of data. Accordingly, a full set of the data may be stored in these identity hubs.

However, the identity hubs 613 and 614 may have less memory space. Accordingly, in these identity hubs a descriptor of the data stored in the first and second identity hubs may be included. Alternatively, a record of changes made to the data in other identity hubs may be included. Thus, changes in one of the identity hubs 610 are either fully replicated in the other identity hubs or at least a record or descriptor of that data is recorded in the other identity hubs.

Because the identity hubs may be multiple instances of the same identity hub, only a full description of the first identity hub 611 will be provided as this description may also apply to the identity hubs 612 through 614. As illustrated, identity hub 611 may include data storage 620. The data storage 620 may be used to store any type of data that is associated with the DID owner 401. In one embodiment the data may be a collection 622 of a specific type of data corresponding to a specific protocol. For example, the collection 622 may be medical records data that corresponds to a specific protocol for medical data. The collection 622 may include any other type of data, such as attestations made by or about the DID owner 401.

In one embodiment, the stored data may have different authentication and privacy settings 621 associated with the stored data. For example, a first subset of the data may have a setting 621 that allows the data to be publicly exposed, but that does not include any authentication to the DID owner 401. This type of data may be for relatively unimportant data such as color schemes and the like. A second subset of the data may have a setting 621 that allows the data to be publicly exposed and that includes authentication to the DID owner 401. A third subset of the data may have a setting 621 that encrypts the subset of data with the private key 406 and public key 407 pair (or some other key pair) associated with the DID owner 401. This type of data will require a party to have access to the public key 407 (or to some other associated public key) in order to decrypt the data. This process may also include authentication to the DID owner 401. A fourth subset of the data may have a setting 621 that restricts this data to a subset of third parties. This may require that public keys associated with the subset of third parties be used to decrypt the data. For example, the DID owner 401 may cause the setting 621 to specify that only public keys associated with friends of the DID owner 401 may decrypt this data. With respect to data stored by the storage module 580, these settings 611 may be at least partially composed by the storage module 580 of FIG. 5.

In some embodiments, the identity hub 611 may have a permissions module 630 that allows the DID owner 401 to set specific authorization or permissions for third parties such as third parties 601 and 602 to access the identity hub. For example, the DID owner 401 may provide access permission to his or her spouse to all the data 620. Alternatively, the DID owner 401 may allow access to his or her doctor for any medical records. It will be appreciated that the DID owner 401 may give permission to any number of third parties to access a subset of the data 620. This will be explained in more detail to follow. With respect to data stored by the storage module 580, these access permissions 630 may be at least partially composed by the storage module 580 of FIG. 5.

The identity hub 611 may also have a messaging module 640. In operation, the messaging module allows the identity hub to receive messages such as requests from parties such as third parties 601 and 602 to access the data and services of the identity hub. In addition, the messaging module 640 allows the identity hub 611 to respond to the messages from the third parties and to also communicate with a DID resolver 650. This will be explained in more detail to follow. The ellipsis 616 represents that the identity hub 611 may have additional services as circumstances warrant.

In one embodiment, the DID owner 401 may wish to authenticate a new device 501 with the identity hub 611 that is already associated with the DID 405 in the manner previously described. Accordingly, the DID owner 401 may utilize the DID management module 520 associated with the new user device 501 to send a message to the identity hub 611 asserting that the new user device is associated with the DID 405 of the DID owner 401.

However, the identity hub 611 may not initially recognize the new device as being owned by the DID owner 401. Accordingly, the identity hub 611 may use the messaging module 640 to contact the DID resolver 650. The message sent to the DID resolver 650 may include the DID 405.

The DID resolver 650 may be a service, application, or module that is configured in operation to search the distributed ledger 420 for DID documents associated with DIDs. Accordingly, in the embodiment the DID resolver 650 may search the distributed ledger 420 using the DID 405, which may result in the DID resolver 650 finding the DID document 410. The DID document 410 may then be provided to the identity hub 611.

As discussed previously, the DID document 410 may include a public key 408 or 409 that is associated with the new user device 501. To verify that the new user device is owned by the DID owner 401, the identity hub 611 may provide a cryptographic challenge to the new user device 501 using the messaging module 640. This cryptographic challenge will be structured such that only a device having access to the private key 406 will be able to successfully answer the challenge.

In this embodiment, since the new user device is owned by DID owner 401 and thus has access to the private key 406, the challenge may be successfully answered. The identity hub 611 may then record in the permissions 630 that the new user device 501 is able to access the data and services of the identity hub 611 and also the rest of the identity hubs 610.

It will be noted that this process of authenticating the new user device 501 was performed without the need for the DID owner 401 to provide any username, password or the like to the provider of the identity hub 611 (i.e., the first cloud storage provider) before the identity hub 611 could be accessed. Rather, the access was determined in a decentralized manner based on the DID 405, the DID document 410, and the associated public and private keys. Since these were at all times in the control of the DID owner 401, the provider of the identity hub 611 was not involved and thus has no knowledge of the transaction or of any personal information of the DID owner 401.

In another example embodiment, the DID owner 401 may provide the DID 405 to the third-party entity 601 so that the third party may access data or services stored on the identity hub 611. For example, the DID owner 401 may be a human who is at a scientific conference who desires to allow the third party 601, who is also a human, access to his or her research data. Accordingly, the DID owner 401 may provide the DID 405 to the third party 601.

Once the third party 601 has access to the DID 405, he or she may access the DID resolver 650 to access the DID document 410. As previously discussed, the DID document 410 may include an end point 413 that is an address or pointer to services associated with the decentralized identity.

Completing the research data example, the third party 601 may send a message to the messaging module 640 asking for permission to access the research data. The messaging module 640 may then send a message to the DID owner 401 asking if the third party 601 should be given access to the research data. Because the DID owner desires to provide access to this data, the DID owner 401 may allow permission to the third party 601 and this permission may be recorded in the permissions 630.

The messaging module 640 may then message the third party 601 informing the third party that he or she is able to access the research data. The identity hub 611 and the third party 601 may then directly communicate so that the third party may access the data. It will be noted that in many cases, it will actually be an identity hub associated with the third party 601 that communicates with the identity hub 611. However, it may be a device of the third party 601 that does the communication.

Advantageously, the above described process allows the identity hub 611 and the third party 601 to communicate and to share the data without the need for the third party to access the identity hub 611 in the conventional manner. Rather, the communication is provisioned in the decentralized manner using the DID 405 and the DID document 410. This advantageously allows the DID owner to be in full control of the process.

As shown in FIG. 6, the third party 602 may also request permission for access to the identity hub 611 using the DID 405 and the DID document 410. Accordingly, the embodiments disclosed herein allow access to any number of third parties to the identity hubs 610.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system configured to generate a cryptographic key by connecting with one of multiple possible entropy generation components that may provide input entropy to be used for generating the cryptographic key, said computing system comprising:
   one or more processors; and
   one or more computer-readable hardware storage devices that store computer-executable instructions that are executable by the one or more processors to cause the computing system to at least:
      cause a key generation component, which is configured to generate a cryptographic key based on input entropy that is generated by a separate entropy generation component, to provide an interface that exposes a desired set of one or more entropy characteristics that the input entropy is to have in order for the input entropy to be used by the key generation component to generate the cryptographic key, wherein the desired set of one or more entropy characteristics includes a maximum or minimum amount of time that is to be used in order to generate the input entropy;
      cause a selection component to interpret the exposed desired set of one or more entropy characteristics;
      cause the selection component to select, from among multiple available entropy generation components, a particular one entropy generation component, wherein:
         the multiple available entropy generation components are configured to provide entropy having varying characteristics,
         the particular one entropy generation component is selected based on a determination that the particular one entropy generation component is able to provide the input entropy having the desired set of one or more entropy characteristics such that the particular one entropy generation component is determined to be able to generate the input entropy within the designated maximum or minimum amount of time included in the set of one or more entropy characteristics, and
         as a result of the particular one entropy generation component generating the input entropy instead of the cryptographic key generator generating the input entropy, the cryptographic key generator is provided with a level of distributed control in generating the cryptographic key by imposing a minimum standard for generating the input entropy, said minimum standard including designating the maximum or minimum amount of time that is to be used to generate the input entropy;
      in response to the particular one entropy generation component being selected, connect with the particular one entropy generation component via the interface;
      receive, via the interface, the input entropy from the particular one entropy generation component, the input entropy being designed in accordance with the desired set of one or more entropy characteristics; and
      cause the cryptographic key generator to generate the cryptographic key using the input entropy.

2. The computing system in accordance with claim 1, wherein the desired set of one or more entropy characteristics include a desired size of the input entropy.

3. The computing system in accordance with claim 1, wherein the desired set of one or more entropy characteristics include a desired type of the input entropy.

4. The computing system in accordance with claim 1, wherein the desired set of one or more entropy characteristics include a desired level of the input entropy.

5. The computing system in accordance with claim 1, wherein the desired set of one or more entropy characteristics include a designation of a seed that is to be used to generate the input entropy.

6. The computing system in accordance with claim 1, wherein the cryptographic key is used for claims having a decentralized identifier as a subject.

7. The computing system in accordance with claim 1, wherein the cryptographic key is a master key.

8. The computing system in accordance with claim 1, wherein the cryptographic key is a derived key.

9. The computing system in accordance with claim 1, wherein the desired set of one or more entropy characteristics describe characteristics for use for a parent cryptographic key, and wherein the cryptographic key is the parent cryptographic key.

10. The computing system in accordance with claim 9, wherein the interface also exposes a set of one or more child entropy characteristics for child input entropy to be used to generate a child cryptographic key, and wherein the system is further configured to:
    receive, via the interface, child cryptographic key input entropy that satisfies the set of one or more child entropy characteristics; and
    generate the child cryptographic key using the child cryptographic key input entropy.

11. The computing system in accordance with claim 1, wherein the computing system further includes a library of entropy generation components, and wherein connecting with the particular one entropy generation component includes:
    selecting the particular one entropy generation component from the library of entropy generation components; and causing the particular one entropy generation component to be connected via the interface to the key generation component.

12. The computing system in accordance with claim 11, wherein selecting the particular one entropy generation component and causing the particular one entropy generation component to be connected to the key generation component is performed by the selection component.

13. The computing system in accordance with claim 11, wherein at least one of the multiple available entropy generation components is provided by a user.

14. The computing system in accordance with claim 13, wherein the desired set of one or more entropy characteristics is specific to an application, and wherein at least one entropy generation component included in the multiple available entropy generation components is part of the application.

15. The computing system in accordance with claim 11, wherein the desired set of one or more entropy characteristics is specific to an application, and wherein at least one entropy generation component included in the multiple available entropy generation components is part of the application.

16. The computing system in accordance with claim 15, wherein the application is a wallet of a decentralized identifier.

17. The computing system in accordance with claim 1, wherein the desired set of one or more entropy characteristics is specific to a first application,
wherein, if the input entropy is to be provided to a second application for generating the cryptographic key, the interface exposes a second set of one or more entropy characteristics that is different than the first set of one or more entropy characteristics.

18. A method for generating a cryptographic key by connecting with one of multiple possible entropy generation components that may provide input entropy to be used for generating the cryptographic key, the method comprising:
causing a key generation component, which is configured to generate a cryptographic key based on input entropy that is generated by a separate entropy generation component, to provide an interface that exposes a desired set of one or more entropy characteristics that the input entropy is to have in order for the input entropy to be used by the key generation component to generate the cryptographic key, wherein the desired set of one or more entropy characteristics includes a maximum or minimum amount of time that is to be used in order to generate the input entropy;
causing a selection component to interpret the exposed desired set of one or more entropy characteristics;
causing the selection component to select, from among multiple available entropy generation components, a particular one entropy generation component, wherein:
the multiple available entropy generation components are configured to provide entropy having varying characteristics,
the particular one entropy generation component is selected based on a determination that the particular one entropy generation component is able to provide the input entropy having the desired set of one or more entropy characteristics such that the particular one entropy generation component is determined to be able to generate the input entropy within the designated maximum or minimum amount of time included in the set of one or more entropy characteristics, and as a result of the particular one entropy generation component generating the input entropy instead of the cryptographic key generator generating the input entropy, the cryptographic key generator is provided with a level of distributed control in generating the cryptographic key by imposing a minimum standard for generating the input entropy, said minimum standard including designating the maximum or minimum amount of time that is to be used to generate the input entropy;
in response to the particular one entropy generation component being selected, connecting with the particular one entropy generation component via the interface;
receiving, via the interface, the input entropy from the particular one entropy generation component, the input entropy being designed in accordance with the desired set of one or more entropy characteristics; and
causing the cryptographic key generator to generate the cryptographic key using the input entropy.

19. One or more hardware storage devices that store instructions that are executable by one or more processors of a computing system to cause the computing system to at least:
cause a key generation component, which is configured to generate a cryptographic key based on input entropy that is generated by a separate entropy generation component, to provide an interface that exposes a desired set of one or more entropy characteristics that the input entropy is to have in order for the input entropy to be used by the key generation component to generate the cryptographic key, wherein the desired set of one or more entropy characteristics includes a maximum or minimum amount of time that is to be used in order to generate the input entropy;
cause a selection component to interpret the exposed desired set of one or more entropy characteristics;
cause the selection component to select, from among multiple available entropy generation components, a particular one entropy generation component, wherein:
the multiple available entropy generation components are configured to provide entropy having varying characteristics,
the particular one entropy generation component is selected based on a determination that the particular one entropy generation component is able to provide the input entropy having the desired set of one or more entropy characteristics such that the particular one entropy generation component is determined to be able to generate the input entropy within the designated maximum or minimum amount of time included in the set of one or more entropy characteristics, and
as a result of the particular one entropy generation component generating the input entropy instead of the cryptographic key generator generating the input entropy, the cryptographic key generator is provided with a level of distributed control in generating the cryptographic key by imposing a minimum standard for generating the input entropy, said minimum standard including designating the maximum or minimum amount of time that is to be used to generate the input entropy;
in response to the particular one entropy generation component being selected, connect with the particular one entropy generation component via the interface;
receive, via the interface, the input entropy from the particular one entropy generation component, the input entropy being designed in accordance with the desired set of one or more entropy characteristics; and
cause the cryptographic key generator to generate the cryptographic key using the input entropy.

* * * * *